United States Patent
Helmig et al.

(10) Patent No.: US 6,822,218 B2
(45) Date of Patent: Nov. 23, 2004

(54) METHOD OF AND APPARATUS FOR WAVELENGTH DETECTION

(75) Inventors: Christian Helmig, Werl (DE); Jörg Teunissen, Ratingen (DE)

(73) Assignee: Maschinenfabrik Reinhausen GmbH, Regensburg (DE)

( * ) Notice: Subject to any disclaimer, the term of this patent is extended or adjusted under 35 U.S.C. 154(b) by 193 days.

(21) Appl. No.: 09/919,338

(22) Filed: Jul. 31, 2001

(65) Prior Publication Data

US 2002/0027944 A1 Mar. 7, 2002

(30) Foreign Application Priority Data

Aug. 1, 2000 (DE) .......................................... 100 37 501

(51) Int. Cl.[7] .............................. G01J 4/00; G01J 5/08
(52) U.S. Cl. .......................... 250/227.18; 250/227.23; 356/32; 385/12
(58) Field of Search ...................... 250/227.18, 227.23; 385/12, 37; 356/477–478, 35.5, 519; 374/141, 152, 130–132

(56) References Cited

U.S. PATENT DOCUMENTS

| | | |
|---|---|---|
| 5,493,113 A | 2/1996 | Dunphy et al. |
| 5,513,913 A | 5/1996 | Ball |
| 6,137,565 A | 10/2000 | Ecke et al. |
| 6,335,524 B1 * | 1/2002 | Udd et al. ............. 250/227.18 |
| 6,597,822 B1 * | 7/2003 | Moslehi et al. ................ 385/13 |

FOREIGN PATENT DOCUMENTS

| | | |
|---|---|---|
| DE | 198 21 616 A1 | 11/1999 |
| EP | 0 984 254 | 3/2000 |
| WO | WO 98 17969 | 4/1998 |

OTHER PUBLICATIONS

HP 71450B,71451B & 71452B, Optical Spectrum Analyzers, Hewlett Packard, 8 pages.
"Fiber Bragg Gratings"; advanced optics solution;Product information–AOS GmbH; 3 pages.
"The Most Precise Wavelength Measurement Capabilities . . . "; Wavelength Meters; 10 pages.
"Optical Spectrum Analyzer Family",Specification; Hewlett Packard; 8 pages.

* cited by examiner

Primary Examiner—Patrick J Lee
(74) Attorney, Agent, or Firm—Herbert Dubno (57) ABSTRACT

A reflected light from a Bragg grating in an electrical transformer or other apparatus at which temperature is to be measured, is positioned by an optocoupler through a second fiber provided with a second Bragg grating whose reflection wavelength is different from that of the first grating. The nonreflected light intensity is measured by a photodetector and is used to signal the temperature measurement.

3 Claims, 7 Drawing Sheets

METHOD OF AND APPARATUS FOR WAVELENGTH DETECTION

FIELD OF THE INVENTION

Our present invention relates to a method of and to an apparatus for wavelength detection in the determination of temperature by means of a fiber Bragg grating impressed in or written in a glass fiber. More particularly, the invention relates to a method of measuring a temperature in an electrical apparatus, particularly an electric transformer, utilizing a form of wavelength detection.

BACKGROUND OF THE INVENTION

A Bragg grating impressed in or written into a glass fiber has, by virtue of its characteristic geometry, a wavelength selective property. Only a respective reflected Bragg wavelength having a limited bandwidth, is reflected by such a grating when a broad-band light is conducted thereto. This property of reflecting a limited bandwidth light is dependent upon external influences like temperature or distortion of the Bragg and enables a fiber Bragg grating to be used as a sensor, especially for temperature. The evaluation of the signal in the past has been limited to a highly precise wavelength detection in the picometer to nanometer range. The Bragg reflection wavelength is directly dependent upon the glass fiber temperature and thus the temperature in the vicinity of the glass fiber at the measurement location which can be in an electric transformer.

U.S. Pat. No. 5,513,913 to Ball et al discloses the provision of a plurality of fiber Bragg gratings in a glass fiber which act independently of one another. It is possible to identify the different Bragg gratings and thus, based on the slight shift in the Bragg reflection wavelength with temperature variation at each measurement location, utilizing a broad-band light source, to determine a number of different temperatures at a number of different locations. Each of the Bragg gratings written into the glass fiber can then be disposed at the respective measurement location.

U.S. Pat. No. 5,493,113 to Dunphy et al describes a similar arrangement in which the glass fiber in which the Bragg grating is inscribed is partly fixed in a tube, i.e. is surrounded by a capillary. The evaluation of the signal obtained has been not described in detail in this patent which only mentions detectors.

However, all of the known arrangements of the aforedescribed type determine temperature changes at the measurement location by variations of the reflection wavelength and thus evaluate the latter to obtain information as to the measured temperature. The linear dependency of the reflection wavelength upon the glass temperature can be detected and converted into a temperature measurement with the aid of commercial optical spectrum analysis, for example, the Hewlett Packard type HP 71450B, 7125B, 71452B and 86140A or the series WA spectrum analyzers of Burleigh.

A drawback in the use of such analyzers for fiber Bragg temperature measurements utilizing wavelength detection and spectrum analyzers is the high cost of the measurement apparatus and the fact that such apparatus is overdimensioned for the type of wavelength detection which is required.

German patent document DE-A 198 21 616 describes an apparatus for determining the temperature and strain of an optical fiber utilizing a broad-band light source, a fiber coupler to couple the light from the light source into the optical fiber which can be inscribed with one or more Bragg gratings and for coupling the reflected light from the Bragg grating into a further glass fiber. An evaluating unit is coupled to the second glass fiber to evaluate the optical signal delivered thereby. The evaluating unit, to which the second glass fiber is connected, is in turn an optical input, two optical splitters for transmitting the light along two distinct optical paths, means for generating two interferometer paths as different optical wavelengths and a phase modulator in one of these paths. The interferometer arrangement supplies two optical outputs which are subjected to spectral analysis. The apparatus therefore also requires special spectral analyzing means which can be expensive and may be excessive for the kind of wavelength detection required for temperature measurements utilizing a Bragg grating.

OBJECTS OF THE INVENTION

The principal object of the present invention is to provide a simple and economical process or method for detecting wavelength utilizing a Bragg grating system or, more specifically, for measuring a temperature, especially in an electrical apparatus, whereby drawbacks of earlier systems re avoided.

Another object of the invention is to provide a low-cost wavelength detection system for use in the measurement of a temperature in an electrical apparatus, especially a transformer, which in spite of its simplicity, enables an exact measurement of wavelength change with temperature variation and which thus can be utilized for highly precise temperature measurements in such apparatus.

It is also an object of the invention to provide an improved apparatus for carrying out the method.

SUMMARY OF THE INVENTION

These objects and others which will become apparent hereinafter are attained, in accordance with the invention in a method of wavelength detection for the measurement of temperature by means of a glass fiber whereby:

into a first glass fiber with a Bragg grating with a specific wavelength $\lambda_{BG1}$, broad-band light is launched, the first glass fiber is optically coupled with a second glass fiber by an optocoupler, the first glass fiber with its first Bragg grating is introduced into an electrical apparatus, usually a transformer, to position the first Bragg grating at a location at which a temperature is to be measured, a temperature increase in this region shifts the specific wavelength $\lambda_{BG1}$ of the first Bragg grating, the temperature-dependent reflected wavelength portion of the first Bragg grating is supplied to the second glass fiber, i.e. coupled thereto, and the light coupled into the second glass fiber is then evaluated with an output signal of the evaluating unit being a measure of the temperature of the region of the electrical apparatus whose temperature is to be determined.

According to the invention, in the second glass fiber, a second Bragg grating II with a specific reflection wavelength $\lambda_{BG2}$ is provided whereby $\lambda_{BG2}$ is different from $\lambda_{BG1}$, the light reaching the second Bragg grating is that which was reflected from the first Bragg grating, and the nonreflected portion of the light traversing the second Bragg grating is fed to a photodetector whose output voltage is thus dependent on light intensity (i.e. is reduced as a function of light intensity), and thus a measurement of the temperature.

The method of measuring the temperature in the electrical apparatus thus comprises the steps of:

(a) launching a broad-band light into a first glass fiber impressed with a first Bragg grating having a specific Bragg reflection wavelength $\lambda_{BG1}$;

(b) optically coupling the first glass fiber with a second glass fiber impressed with a second Bragg grating having a specific Bragg reflection wavelength $\lambda_{BG2}$ different from the specific Bragg reflection wavelength $\lambda_{BG1}$ of the first Bragg grating and so coupled with the first glass fiber that reflected light from the first Bragg grating is conducted to the second Bragg grating;

(c) introducing the glass fiber into an electrical apparatus to position the first Bragg grating at a location at which a temperature is to be determined, whereby the Bragg reflection wavelength $\lambda_{BG1}$ of the first Bragg grating is shifted as a function of change in the temperature at the location; and (d) feeding nonreflected light from the second Bragg grating to a photodetector having an output voltage dependent upon detected light intensity and representing a measurement of the temperature at the location.

Preferably the first glass fiber is formed with a plurality of the first Bragg gratings, the method further comprising positioning each of the first Bragg gratings at different locations in the electrical apparatus at which respective temperatures are to be measured, and varying the specific Bragg reflection wavelength $\lambda_{BG2}$ of the second Bragg grating by mechanically deforming the second glass fiber in a micrometer range.

The specific wavelengths of all of the glass fibers are so dimensioned that, upon a measured temperature in the electrical apparatus exceeding a predetermined critical temperature, an output voltage level at the photodetector will exceed a limiting value and automatically generate an alarm signal.

The apparatus for measuring the temperature in the electrical apparatus can comprise:

a first glass fiber impressed with a first Bragg grating having a specific first Bragg reflection wavelength $\lambda_{BG1}$ and positioned at a location in an electrical apparatus at which a temperature is to be measured, whereby the Bragg reflection wavelength $\lambda_{BG1}$ of the first Bragg grating is shifted as a function of change in the temperature at the location;

a source of broad-band light coupled to the first glass fiber for launching the broad-band light into the first glass fiber;

a second glass fiber impressed with a second Bragg grating having a specific second Bragg reflection wavelength $\lambda_{BG2}$ different from the specific Bragg reflection wavelength $\lambda_{BG1}$ of the first Bragg grating;

an optocoupler for coupling the first glass fiber with the second glass fiber so that reflected light from the first Bragg grating is conducted to the second Bragg grating; and a photodetector coupled to the second glass fiber downstream of the second Bragg grating and receiving nonreflected light from the second Bragg grating, the photodetector having an output voltage dependent upon detected light intensity and representing a measurement of the temperature at the location.

Preferably a plurality of spaced-apart first Bragg gratings are written into the first glass fiber and are positioned at a corresponding number of locations of the electrical apparatus at which temperatures are to be measured, and the second Bragg grating has a variable second Bragg reflection wavelength $\lambda_{BG2}$.

The photodetector can comprise a photodiode followed by a transimpedance amplifier.

The apparatus can also comprise means for mechanically deforming the second glass fiber in a micrometer range to vary the specific second Bragg reflection wavelength $\lambda_{BG2}$ of the second glass fiber.

The optocoupler can have a branch to which a further glass fiber is coupled, the apparatus further comprising means for converting a light signal in the further glass fiber to a voltage, an output signal of the photodetector being normalized to the voltage into which the light signal in the further glass fiber is converted.

The invention is based upon the fact that the detection of the environmentally affected and here temperature-dependent Bragg wavelength can utilize the steep characteristic of the second Bragg grating with a slightly shifted central wavelength.

BRIEF DESCRIPTION OF THE DRAWING

The above and other objects, features, and advantages will become more readily apparent from the following description, reference being made to the accompanying drawing in which.

SPECIFIC DESCRIPTION

From FIGS. 1, 4, 5 and 6, the method of the invention will be readily understood.

Figure 1:
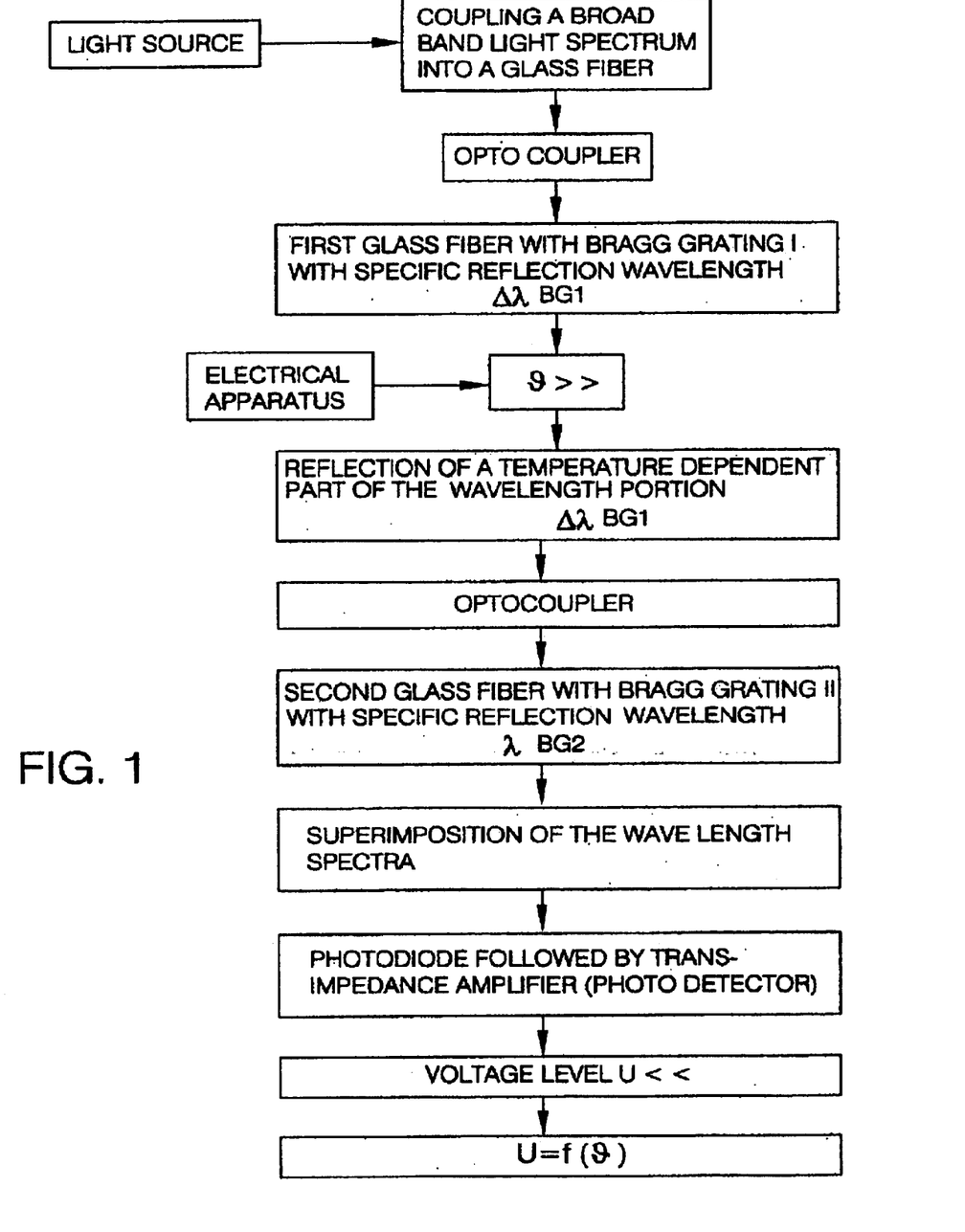
FIG. 1 is a block diagram of the algorithm of a first method of the invention.

From a light source 1, broad-band light is launched into a glass fiber 3 (see the initial steps of the algorithm of FIG. 1). The broad-band radiation is supplied to the optical fiber 3 via an optocoupler 2. The first fiber 3 is impressed with a first Bragg grating I which can be written into the fiber by any of the means known in the art and which has a specific reflective Bragg wavelength $\lambda_{BG3}$.

The first glass fiber 3 in which the first Bragg grating I is impressed, can be introduced into an electric apparatus, for example, a transformer, to the location in the transformer at which the temperature is to be detected.

A second glass fiber, also with an inscribed Bragg grating II having a corresponding reflection Bragg wavelength $\lambda_{BG2}$, is provided and is connected to an evaluating device or circuit. AS has already been described, the two Bragg gratings I and II have different specific Bragg reflection wavelengths $\lambda_{BG1}$ and $\lambda_{BG2}$, whereby both of these light waveguides with the respective Bragg gratings are connected to the optocoupler.

At room temperature (RT) the difference in the Bragg wavelengths in an especially advantageous dimensioning of the system is, for example, 0.15 mn so that the characteristics of the respective median wavelength do not intersect. For signal evaluation it is important that the light reflected by the first Bragg grating I pass unhindered into the second glass fiber and to the second Bragg grating II. If, in the electrical apparatus, a temperature increase arises, for example, as a result of heating of the transformer oil in a power transformer, the spectrum at the Bragg grating I, which is located in the region of the temperature measurement point of the power transformer, is shifted in the direction of the spectrum of the second Bragg grating II. This has been shown in FIG. 4.

The temperature-dependent reflective wavelength part from the Bragg grating I, $\Delta\lambda_{BG1}$, is coupled into the second light-conducting waveguide or glass fiber via the optocoupling.

Using a photodiode and a transimpedance amplifier connected thereto at the output side of the second glass fiber, the light intensity transmitted by the second Bragg grating is converted into a voltage and this voltage is measured. Upon superimposition of the two wavelength spectrums, the voltage level measured at the photodetector is reduced as a function of the temperature increase, since a part of the reflective wavelength spectrum from the first Bragg grating I is reflected at the second Bragg grating II.

Figure 5:
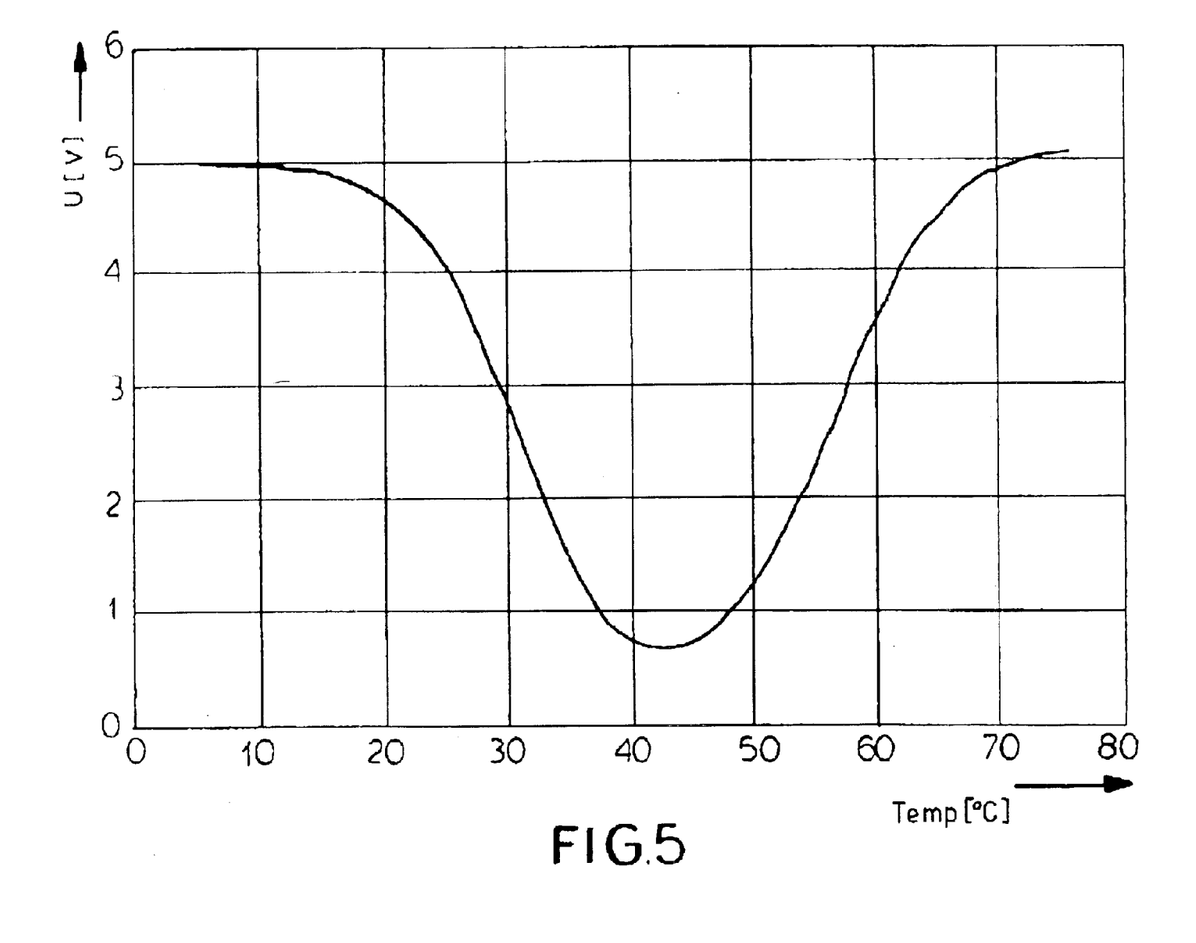
FIG. 5 is a graph of the resulting plot of intensity versus temperature variation.
Figure 6:
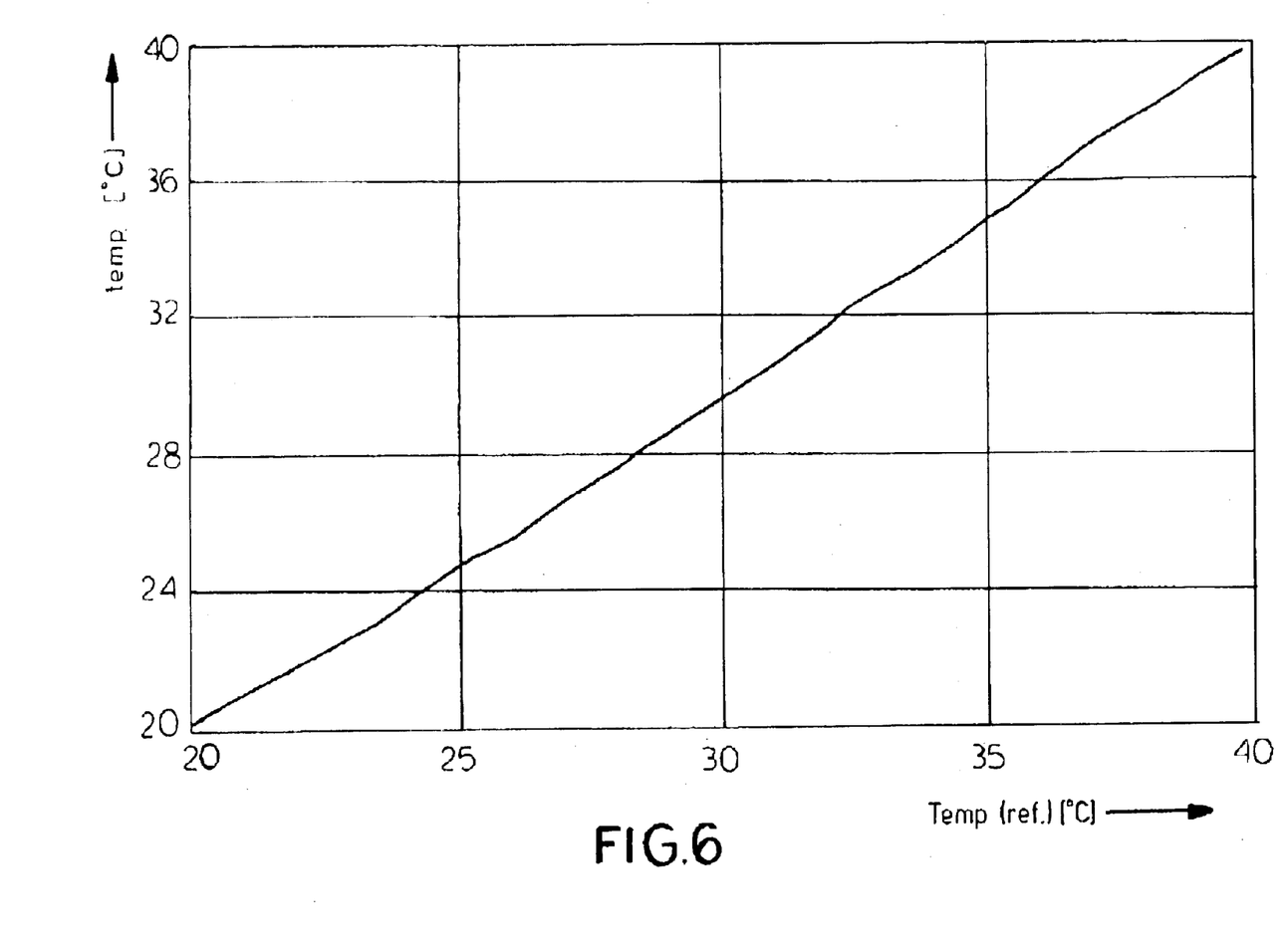
FIG. 6 is a graph showing linearity of temperature measurements with the use of the wavelength detection system of the invention.

This effect is portrayed by the measurement curve shown in FIG. 5. In this curve, the temperature of the electrical apparatus and thus at the Bragg grating I is increased from 5° C. to 75° C. and the output voltage at the photodetector (formed by the combination of the photodiode and the following amplifier) is measured. This output voltage is proportional to the light intensity of the light impinging on the photodiode at 43° C., the measurement curve has a characteristic minimum since at this temperature complete overlap of the two Bragg grating spectrum has occurred.

The characteristic shown in FIG. 5 also indicates the problem of ambivalence in which detection of output intensity cannot be associated with a particular temperature. In such cases it is required to limit the evaluation to a certain temperature measurement range in which a very precise measurement is possible. This is demonstrated by FIG. 6. In another aspect of the invention, thresholds or temperature changes passing thresholds, can be detected so that the measurement of hot spots can be carried out simply. In this case the grating spectra are so dimensioned with respect to one another that when the temperature exceeds a predetermined critical temperature which can be represented by a reference output voltage level which is understepped by the output voltage, an alarm is triggered.

Figure 3:
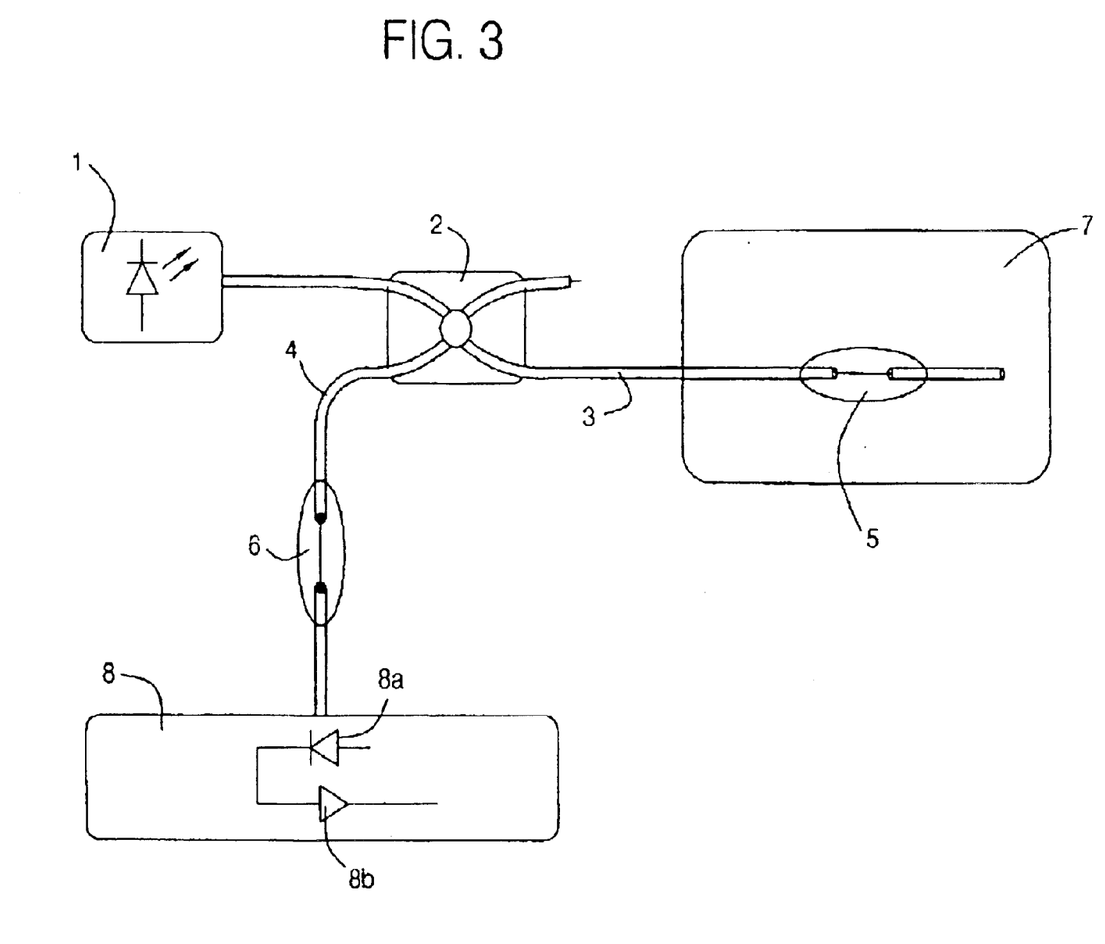
FIG. 3 is a diagram of the apparatus in accordance with the first embodiment.
Figure 3A:
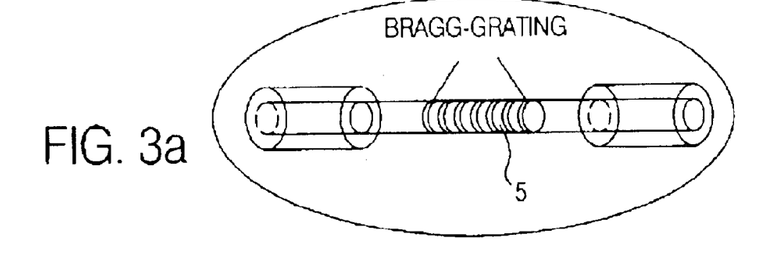
FIG. 3a is a detail showing the Bragg grating in diagrammatic form.
Figure 4:
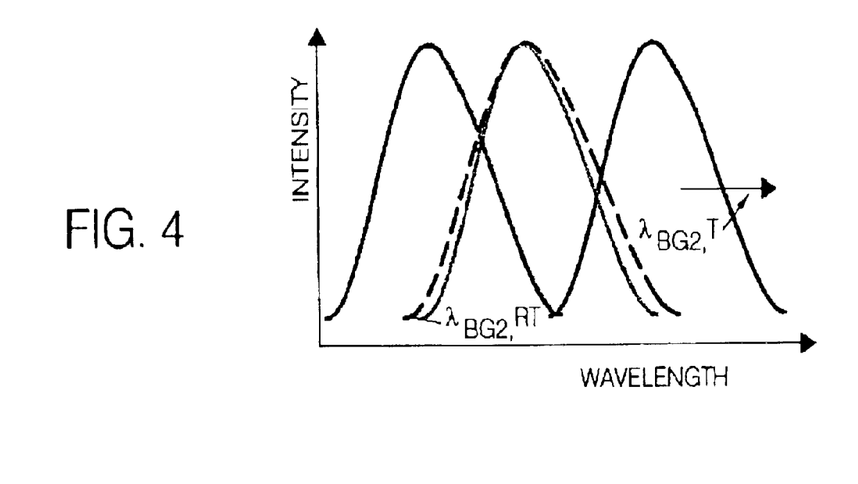
FIG. 4 is a graph of the Bragg grating characteristic of temperature increase and in which intensity is plotted against wavelength.

The apparatus for this apparatus has been shown in FIGS. 3 and 3a in which the broad-band light source 1 is connected to one of the four terminals and the optocoupler 2 connects the light source 1 to the two glass fibers 3 and 4. The Bragg grating 5, seen also in FIG. 3a, is written into the glass fiber 3 with the characteristic Bragg wavelength $\lambda_{BG1}$.

The first glass fiber 3 is introduced into the electrical apparatus 7, usually an electrical power transformer, whose temperature is to be detected. The free end of the glass fiber 4 is connected with a photodetector 8 which includes, in the manner described, the photodiode 8a and an amplifier 8b connected therewith.

In FIG. 3, the two Bragg gratings 5 and 6 are only schematically shown as ellipses. FIG. 3a represents an enlargement of the Bragg grating region.

The invention enables rapid and low cost detection of wavelength changes and thus responds quickly to temperature changes by comparison with conventional measurement systems which operate with a response time in the range of several Hz. The invention permits a variety of new approaches to temperature detection and can be used effectively for rapid localization and response to hot spots in electrical transformers.

Figure 2:
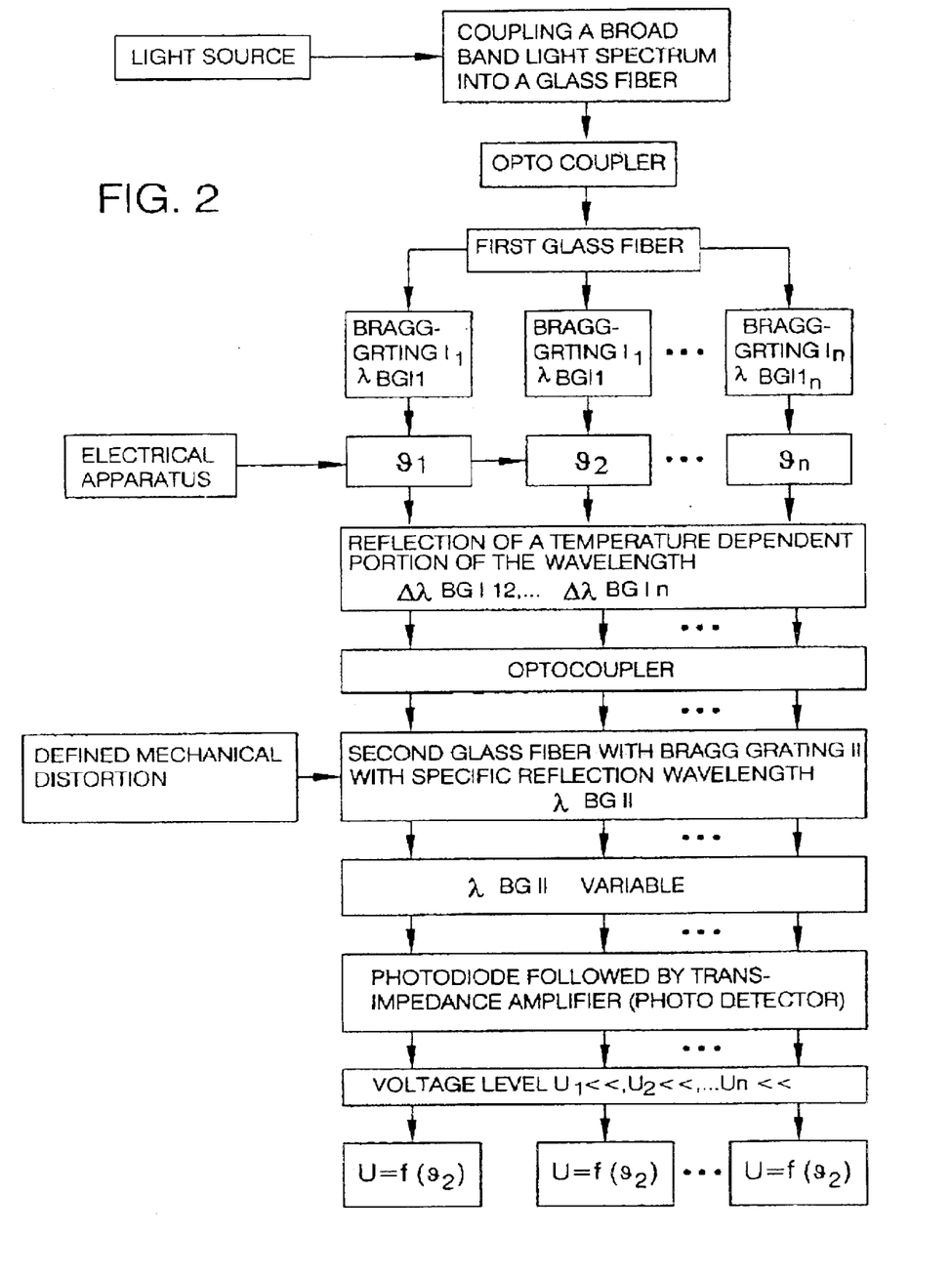
FIG. 2 is a block diagram of an algorithm of a second embodiment of the method.

FIG. 2 shows the algorithm or method wherein, in the first glass fiber a plurality of different Bragg gratings $I_1, I_2, \ldots I_n$, are inscribed and which have different characteristic reflection wavelengths. In this manner it is possible that a single first glass fiber to determine temperatures at separate locations in the electrical apparatus. The Bragg grating II in the second glass fiber can be mechanically deformed or distorted to vary its specific reflection wavelength. The means for this purpose has been shown at 9 in FIG. 7.

Figure 7:
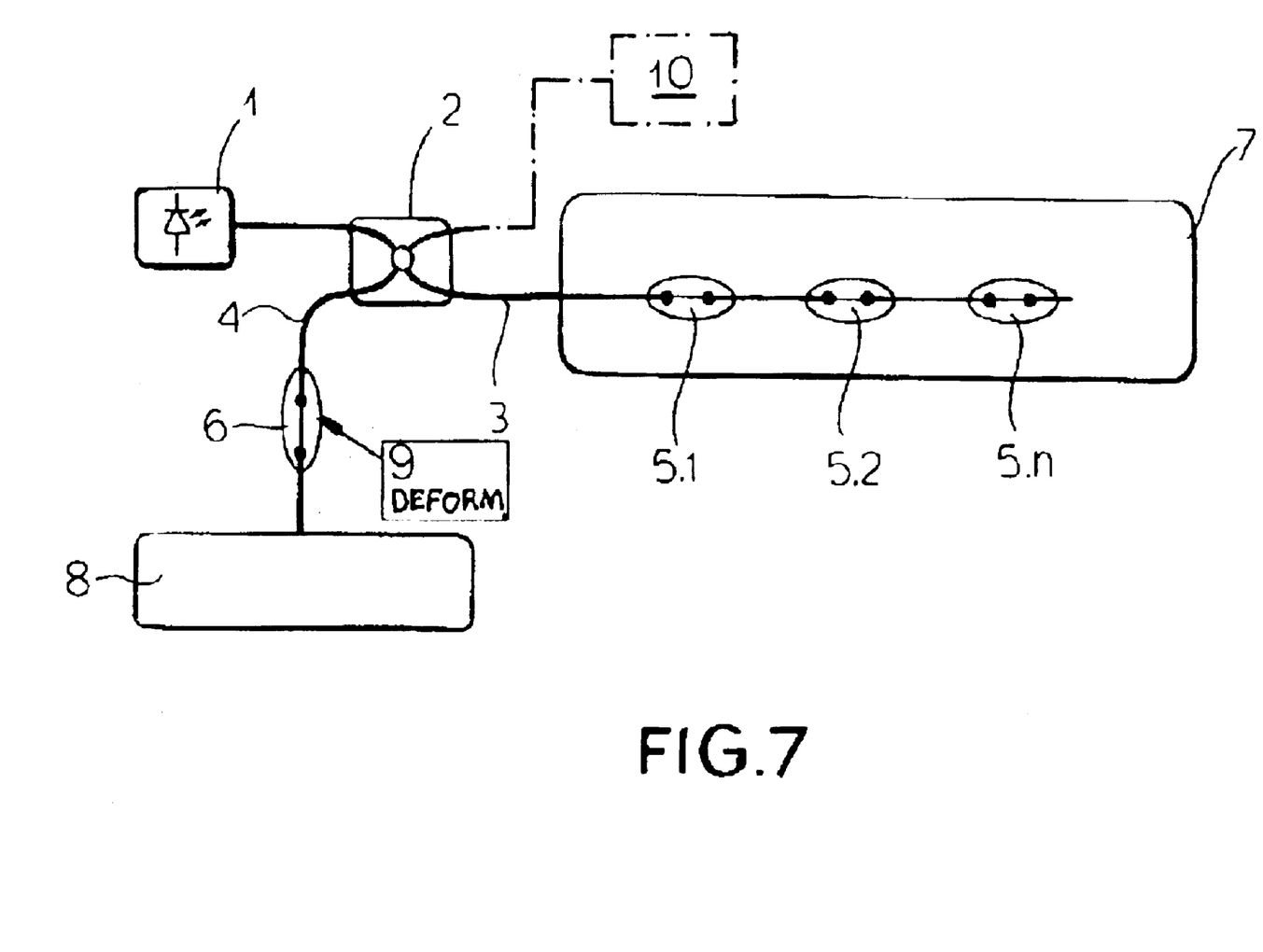
FIG. 7 is a diagram similar to FIG. 3 but relevant to FIGS. 4–6 and the second embodiment of the invention.

By the variation of the specific wavelength of the second Bragg grating, the temperatures at the Bragg gratings of the first glass fiber can be read out in succession. Furthermore, using this system, it is possible to evaluate a signal output for a quasidistributed temperature sensor and to convert from, for example, threshold detection to a multipoint on-line temperature measurement.

In FIG. 7, the distributed Bragg gratings are represented at 5.1, 5.2 and 5.m, respectively. The Bragg gratings can be commercially available units of the type described in the brochure entitled "Fiber Bragg Gratings" of the firm Advanced Optics Solutions (AOS) GmbH of Germany. Since a single photodetector of simple construction is used with the invention, spectrum, analyzers of the type hitherto employed are not necessary. The effect of intensity variations at the light source 1 can be compensated by connecting the otherwise unused free branch of the coupler 2, as shown by a dot-dash line in FIG. 7, for example, to additional glass fibers which can parallel the glass fiber 3 and produce a light signal which can be transformed into a voltage to which the output voltage of the photodetector 8 can be normalized as may be necessary to compensate for fluctuations in the light intensity of the source 1. The means for that purpose have been represented at 10 in FIG. 7.

We claim:

1. An apparatus for measuring a temperature in an electrical apparatus, comprising:

a first glass fiber impressed with a first Bragg grating having a specific first Bragg reflection wavelength $\lambda_{BG1}$ and positioned at a location in an electrical apparatus at which a temperature is to be measured, whereby the Bragg reflection wavelength $\lambda_{BG1}$ of said first Bragg grating is shifted as a function of change in said temperature at said location;

a source of broad-band light coupled to said first glass fiber for launching said broad-band light into said first glass fiber;

a second glass fiber impressed with a second Bragg grating having a specific second Bragg reflection wavelength $\lambda_{BG2}$ different from the specific Bragg reflection wavelength $\lambda_{BG1}$ of the first Bragg grating;

an optocoupler for coupling said first glass fiber with said second glass fiber so that reflected light from the first Bragg grating is conducted to said second Bragg grating; and a photodetector coupled to said second glass fiber downstream of said second Bragg grating and receiving nonreflected light from said second Bragg grating, said photodetector having an output voltage dependent upon detected light intensity and representing a measurement of said temperature at said location, a plurality of said first Bragg gratings being written into said first glass fiber in spaced-apart relationship and positioned at a corresponding number of locations of said electrical apparatus at which temperatures are to be measured, said second Bragg grating having a variable second Bragg reflection wavelength $\lambda_{BG2}$, said photodetector comprising a photodiode and a transimpedance amplifier connected to said photodiode, said apparatus, further comprising means for mechanically deforming said second glass fiber in a micrometer range to vary said specific second Bragg reflection wavelength $\lambda_{BG2}$ of said second glass fiber, said optocoupler having a branch to which a further glass fiber is coupled, said apparatus further comprising means for converting a light signal in said further glass fiber to a voltage, an output signal of said photodetector being normalized to the voltage into which the light signal in said further glass fiber is converted said photodetector comprising a photodiode and a transimpedance amplifier connected to said photodiode, said apparatus further comprising means for mechanically deforming said second glass fiber in a micrometer range to vary said specific second Bragg reflection wavelength $\lambda_{BG2}$ of said second glass fiber, said optocoupler having a branch to which a further glass fiber is coupled, said apparatus further comprising means for converting a light signal in said further glass fiber to a voltage, an output signal of said photodetector being normalized to the voltage into which the light signal in said further glass fiber is converted.

2. An apparatus for measuring a temperature in an electrical apparatus, comprising:

a first glass fiber impressed with a first Bragg grating having a specific first Bragg reflection wavelength $\lambda_{BG1}$ and positioned at a location in an electrical apparatus at which a temperature is to be measured, whereby the Bragg reflection waveleneth $\lambda_{BG1}$ of said first Bragg grating is shifted as a function of change in said temperature at said location;

a source of broad-band light coupled to said first glass fiber for launching said broad-band light into said first glass fiber;

a second glass fiber impressed with a second Bragg grating having a specific second Bragg reflection wavelength $\lambda_{BG2}$ different from the specific Bragg reflection wavelength $\lambda_{BG1}$ of the first Bragg grating;

an optocoupler for coupling said first glass fiber with said second glass fiber so that reflected light from the first Bragg grating is conducted to said second Bragg grating; and a photodetector coupled to said second glass fiber downstream of said second Bragg grating and receiving nonreflected light from said second Bragg grating, said photodetector having an output voltage dependent upon detected light intensity and representing a measurement of said temperature at said location, a plurality of said first Bragg gratings being written into said first glass fiber in spaced-apart relationship and positioned at a corresponding number of locations of said electrical apparatus at which temperatures are to be measured, said second Bragg grating having a variable second Bragg reflection wavelength $\lambda_{BG2}$, said photodetector comprising a photodiode and a transimpedance amplifier connected to said photodiode, said apparatus, further comprising means for mechanically deforming said second glass fiber in a micrometer range to vary said specific second Bragg reflection waveleneth $\lambda_{BG2}$ of said second class fiber, said optocoupler having a branch to which a further class fiber is coupled, said apparatus further comprising means for converting a light signal in said further glass fiber to a voltage, an output signal of said photodetector being normalized to the voltage into which the light signal in said further glass fiber is converted, said apparatus further comprising means for mechanically deforming said second glass fiber in a micrometer range to vary said specific second Bragg reflection wavelength $\lambda_{BG2}$ of said second glass fiber, wherein said optocoupler having a branch to which a further glass fiber is coupled, said apparatus further comprising means for converting a light signal in said further glass fiber to a voltage, an output signal of said photodetector being normalized to the voltage into which the light signal in said further glass fiber is converted.

3. An apparatus for measuring a temperature in an electrical apparatus, comprising:

a first glass fiber impressed with a first Bragg grating having a specific first Bragg reflection wavelength $\lambda BG1$ and positioned at a location in an electrical apparatus at which a temperature is to be measured, whereby the Bragg reflection wavelength $\lambda_{BG1}$ of said first Bragg grating is shifted as a function of change in said temperature at said location;

a source of broad-band light coupled to said first glass fiber for launching said broad-band light into said first glass fiber;

a second glass fiber impressed with a second Bragg grating having a specific second Bragg reflection wavelength $\lambda_{BG2}$ different from the specific Bragg reflection wavelength $\lambda_{BG1}$ of the first Bragg grating;

an optocoupler for coupling said first glass fiber with said second glass fiber so that reflected light from the first Bragg grating is conducted to said second Bragg grating; and a photodetector coupled to said second glass fiber downstream of said second Bragg grating and receiving nonreflected light from said second Bragg grating, said photodetector having an output voltage dependent upon detected light intensity and representing a measurement of said temperature at said location, a plurality of said first Bragg gratings being written into said first glass fiber in spaced-apart relationship and positioned at a corresponding number of locations of said electrical apparatus at which temperatures are to be measured, said second Bragg grating having a variable second Bragg reflection waveleneth $\lambda_{BG2}$, said photodetector comprising a photodiode and a transimpedance amplifier connected to said photodiode, said apparatus, further comprising means for mechanically deforming said second glass fiber in a micrometer range to vary said specific second Bragg reflection wavelength $\lambda_{BG2}$ of said second glass fiber, said optocoupler having a branch to which a further glass fiber is coupled, said apparatus further comprising means for converting a light signal in said further glass fiber to a voltage, an output signal of said photodetector being normalized to the voltage into which the light signal in said further glass fiber is converted, said optocoupler having a branch to which a further glass fiber is coupled, said apparatus further comprising means for converting a light signal in said further glass fiber to a voltage, an output signal of said photodetector being normalized to the voltage into which the light signal in said further glass fiber is converted.

* * * * *